(12) United States Patent
Liani

(10) Patent No.: US 12,314,144 B1
(45) Date of Patent: May 27, 2025

(54) AUTOMATIC CLASSIFICATION OF DATA LOSS EVENTS

(71) Applicant: OWNBACKUP LTD., Tel Aviv (IL)

(72) Inventor: Idan Liani, Ramat Gan (IL)

(73) Assignee: Own Data Company Ltd., Tel Aviv (IL)

( * ) Notice: Subject to any disclaimer, the term of this patent is extended or adjusted under 35 U.S.C. 154(b) by 0 days.

(21) Appl. No.: 18/487,132

(22) Filed: Oct. 16, 2023

(51) Int. Cl.
*G06F 16/00* (2019.01)
*G06F 11/14* (2006.01)

(52) U.S. Cl.
CPC ...... *G06F 11/1469* (2013.01); *G06F 11/1451* (2013.01); *G06F 2201/80* (2013.01)

(58) Field of Classification Search
CPC ............ G06F 11/1451; G06F 11/1461; G06F 11/1464; G06F 11/3058; G06F 16/2358; G06F 16/256; G06F 16/22; G06F 16/23; G06F 16/2379; G06F 16/2456; G06F 16/24573; G06F 16/248; G06F 16/252; G06F 16/258; G06F 16/29; G06F 16/9574; G06F 16/172; G06F 16/245; G06F 16/9024; G06F 16/907; G06F 16/951; G06F 16/972; G06F 21/57; G06F 40/143; G06F 40/295; G06F 40/30; G06N 20/00; G06N 3/04; G06N 5/04; H04L 67/1097; H04L 67/568; H04N 2101/00; H04N 7/181; H04N 7/188
See application file for complete search history.

(56) References Cited

U.S. PATENT DOCUMENTS

| | | | |
|---|---|---|---|
| 7,222,133 B1 * | 5/2007 | Raipurkar | G06F 11/1469 707/645 |
| 2019/0179712 A1 * | 6/2019 | Snyder | G06F 11/1464 |
| 2024/0205256 A1 * | 6/2024 | Tormasov | H04L 63/1425 |

OTHER PUBLICATIONS

Wikipedia, "Google Drive," pp. 1-26, last updated Sep. 23, 2023.
(Continued)

*Primary Examiner* — Shyue Jiunn Hwa
(74) *Attorney, Agent, or Firm* — Meitar Patents Ltd.; Daniel Kligler

(57) ABSTRACT

A method, including collecting, during a time period, characteristics of backup operations performed on information sources from a primary system to respective backups on a backup system and multiple restores in which one or more of the sources in the primary system are restored to a state of one of the backups, the restores having associated operations. Backup features are extracted from the characteristics for each backup, and for each given restore, restore features are extracted from the characteristics. training, based on the backup features and the restore features, a model is trained for classifying a given change to the information as including only valid or damaged information. Subsequent to the period, an additional backup is detected. Additional backup features are extracted from the additional backup, and the model is applied to the additional backup features. Finally, an alert is generated upon the model classifying the additional changes as damaged.

25 Claims, 5 Drawing Sheets

(56) References Cited

OTHER PUBLICATIONS

Amazon Web Services, Inc., "Overview of Amazon Web Services", AWS Whitepaper, pp. 1-85, Aug. 5, 2021.
Amazon Web Services, Inc., "Amazon Simple Storage Service," pp. 1-19, Mar. 1, 2006.
Wikipedia, "NTFs," pp. 1-26, last update Sep. 30, 2023.
International Business Machines Corporation, "IBM SPSS software", pp. 1-2, Feb. 2023, as downloaded from https://web.archive.org/web/20230208063443/https://www.ibm.com/spss.

* cited by examiner

AUTOMATIC CLASSIFICATION OF DATA LOSS EVENTS

FIELD OF THE INVENTION

The present invention relates generally to data management, and particularly to training, based on characteristics of backups and restorations of information on storage systems, a model for classifying data loss events.

BACKGROUND OF THE INVENTION

Data backup is the process of creating copies of important information to protect it from data loss events, including destruction, corruption, malicious encryption, and accidental deletion. These copies, known as backups, are stored separately from the original information to ensure their availability in case of a data loss event. Backups serve as a means to restore information to a previous state.

Data restore, on the other hand, refers to the process of retrieving and returning the backed-up information to its original location or an alternate location after a data loss event. Restoration helps recover information to a known good state, allowing organizations or individuals to resume their operations with minimal disruption.

In summary, data backup typically involves making duplicate copies of information, while data restore is the process of retrieving and recovering the backed-up information when needed. These operations are vital for safeguarding information integrity, availability, and continuity in various scenarios, including hardware failures, software errors, malicious attacks, natural disasters, or human errors.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including collecting, during a time period, characteristics of multiple backup operations performed on information sources from a primary storage system to respective backups on a backup storage system and multiple restore operations in which one or more of the information sources in the primary storage system are restored to a state of one of the backups, each of the restore operations having an associated backup operation, extracting, from the collected characteristics for each given backup operation, a set of backup features including changes to the information stored in the information sources and a time of the given backup operation, extracting, from the collected characteristics for each given restore operation, a set of restore features including the associated backup operation for the given restore and a time of the given restore operation, training, based on the sets of the backup features and the sets of the restore features, a processor to apply a model for classifying a given change to the information as including only valid information or including damaged information, detecting, subsequent to the time period, an additional backup operation, extracting an additional set of backup features including additional changes to the information in the additional backup operation, applying, by the processor, the model to the additional set of backup features, and generating an alert upon the model classifying the additional changes as including damaged information.

In some embodiments, the information sources include respective sets of information source components, and further including identifying a most recent backup operation prior to the given backup operation, and wherein extracting the backup features includes detecting the changes between the most recent backup operation prior to the given backup and the given backup operation.

In one information source embodiment, the information sources include tables, and wherein the information source components include records.

In another information source embodiment, a given backup feature includes a number of new information source components in a given information source.

In an additional information source embodiment, a given backup feature includes a number of the information source components deleted from a given information source.

In a further information source embodiment, a given backup feature includes a number of the updated information source components in a given information source.

In a supplemental information source embodiment, a given backup feature includes a count of the information source components in a given information source.

In some embodiments, the information sources include primary information sources, wherein the backups include respective backup information sources having a one-to-one correspondence with the primary information sources, and wherein a given restore feature for the given restore operation includes a given backup information source used in the given restore operation.

In an additional embodiment, the model classifying the changes as including damaged information includes ascribing the given information source to a data loss event class.

In one data loss event class embodiment, the data loss event class includes information destruction.

In another data loss event class embodiment, the data loss event class includes information corruption.

In a further data loss event class embodiment, the data loss event class includes malicious encryption.

In a supplemental data loss event class embodiment, the data loss event class includes accidental deletion.

In some embodiments, the method further includes computing respective labels for the backups, wherein a given feature includes the computed labels, and wherein a given label for a given backup indicates if changes in the given backup includes damaged or only valid information.

In a first restore operation embodiment, the restore operations include respective first identifiers (IDs) referencing respective first operations only backup including valid information, and wherein computing the labels includes classifying the referenced first backup operations as storing only valid information.

In a second restore operation embodiment, the restore operations include respective second IDs referencing respective second backup operations including damaged information in a given information source, and wherein computing the labels includes classifying the referenced second backup operations as storing damaged information.

In one embodiment, a given information source includes a file system.

In another embodiment, a given information source includes a cloud-based storage instance.

In an additional embodiment, a given information source includes an object storage service.

In a further embodiment, a given restore feature for the given restore operation includes a time of the restore operation.

In a supplemental embodiment, the model classifying the changes as includes damaged information includes classifying the additional backup as including damaged information.

In some embodiments, the method further includes training the model with the additional set of backup features.

In additional embodiments, the method further includes receiving an override for the alert, changing the classification for the additional backup from including damaged information to including only valid information, and training the model with the updated classification.

There is also provided, in accordance with an embodiment of the present invention, an apparatus including a memory configured to store a model, and one or more processors configured during a time period, to collect and to store, to the memory, characteristics of multiple backup operations performed on information sources from a primary storage system to respective backups on a backup storage system and multiple restore operations in which one or more of the information sources in the primary storage system are restored to a state of one of the backups, each of the restore operations having an associated backup operation, to extract, from the collected characteristics for each given backup operation, a set of backup features including changes to the information stored in the information sources and a time of the given backup operation, to extract, from the collected characteristics for each given restore operation, a set of restore features including the associated backup operation for the given restore and a time of the given restore operation, to train, based on the sets of the backup features and the sets of the restore features, a given processor to apply the model for classifying a given change to the information as including only valid information or including damaged information, to detect, subsequent to the time period, an additional backup operation, to extract an additional set of backup features including additional changes to the information in the additional backup operation, to apply the model to the additional set of backup features, and to generate an alert upon the model classifying the additional changes as including damaged information.

There is additionally provided, in accordance with an embodiment of the present invention, a computer software product, the product including a non-transitory computer-readable medium, in which program instructions are stored, which instructions, when read by a computer, cause the computer to collect, during a time period, characteristics of multiple backup operations performed on information sources from a primary storage system to respective backups on a backup storage system and multiple restore operations in which one or more of the information sources in the primary storage system is restored to a state of one of the backups, each of the restore operations having an associated backup operation, to extract, from the collected characteristics for each given backup operation, a set of backup features including changes to the information stored in the information sources and a time of the given backup operation, to extract, from the collected characteristics for each given restore operation, a set of restore features including the associated backup operation for the given restore and a time of the given restore operation, to train, based on the sets of the backup features and the sets of the restore features, a processor to apply a model for classifying a given change to the information as including only valid information or including damaged information, to detect, subsequent to the time period, an additional backup operation, to extract an additional set of backup features including additional changes to the information in the additional backup operation, to apply, by the processor, the model to the additional set of backup features, and to generate an alert upon the model classifying the additional changes as including damaged information.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
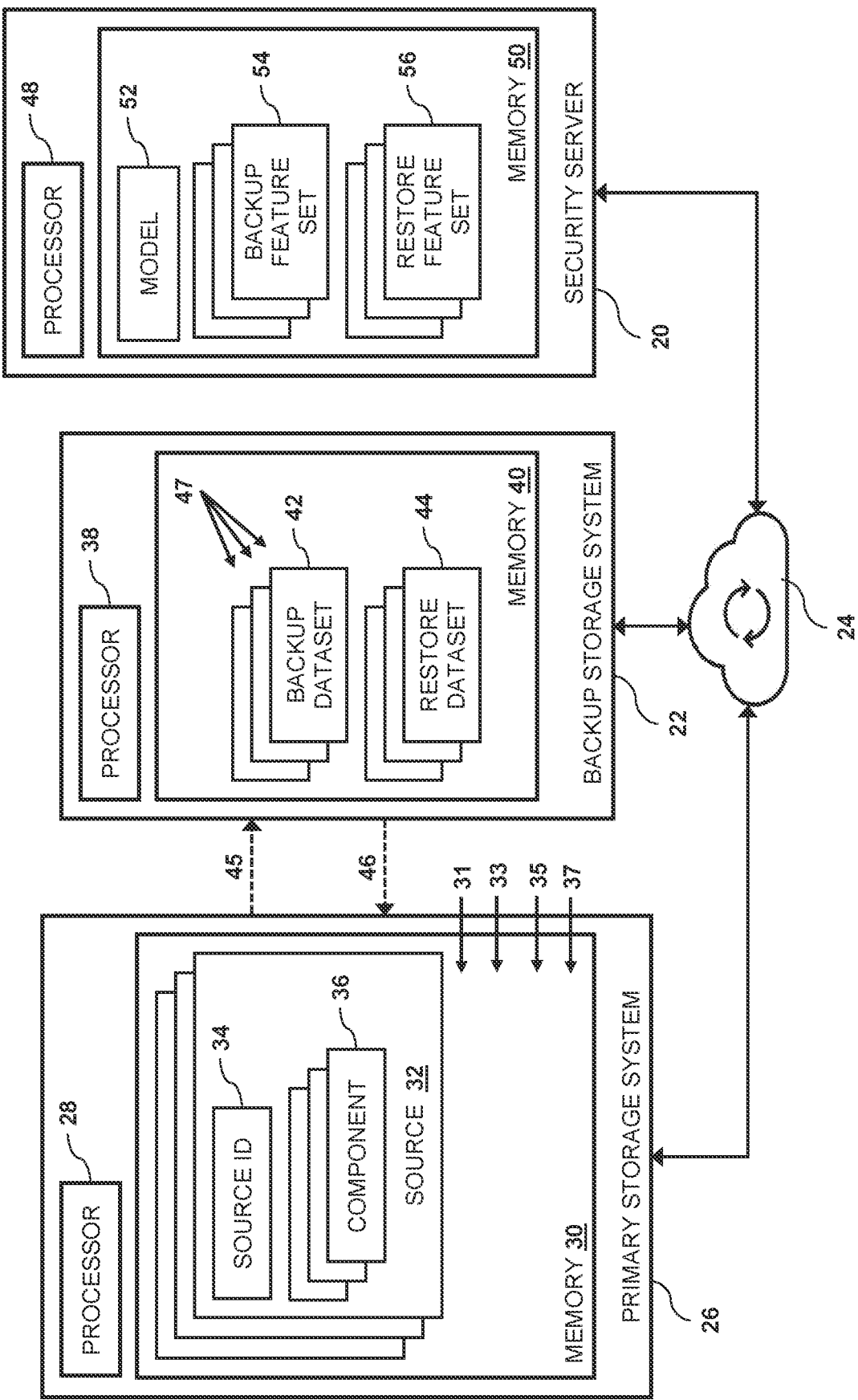
FIG. 1 is a block diagram showing an example of a security server that is configured to implement a model that can analyze characteristics of backups so as to classify a data damaging event, in accordance with an embodiment of the present invention.

Data backup operations are typically performed periodically to minimize information loss/destruction and recovery time. Examples of typical causes of damage and destruction of information include, but are not limited to:

Software bugs or glitches: Software bugs or glitches in operating systems, device drivers, or applications can introduce errors that can damage and destroy information. These issues can arise due to programming errors, compatibility problems, or conflicts with other software components.

Data tampering: Malicious software or viruses can infect computers and cause damage and destruction of information. Ransomware, for example, encrypts or corrupts files, rendering them unusable until a ransom is paid.

Human errors: Accidental damage or destruction of files by users can result in data loss. Mishandling storage media, improper software installations, or executing faulty commands can also lead to data loss.

Embodiments of the present invention provide methods and systems for analyzing information changes in backups so as to detect and classify information loss events (i.e., where information is destroyed or damaged). As described hereinbelow, during a training time period, characteristics are collected for multiple backups of information from a primary storage system to respective backups on a backup storage system. Additionally, during the training period, characteristics are collected for multiple restore operations in which information in the primary storage system is restored to a state of one of the backups. Each of the restore operations has an associated backup from which the information is restored.

Upon completing the collection of the characteristics, a set of backup features comprising changes to information stored in the information sources and a time of the given backup operation is extracted from the collected characteristics for each given backup operation. Additionally, a set of restore features comprising the associated backup operation for the given restore and a time of the given restore operation are extracted from the collected characteristics for each given restore operation. The sets of the backup features and the restore features can then be used to train a processor to apply a model for classifying a given change to the information as comprising only valid information or comprising damaged (e.g., destroyed) information.

Subsequent to the time period (e.g., during production), an additional backup operation is detected, and an additional set of backup features comprising additional changes to the information in the additional backup is extracted. The processor can then apply the model to the additional set of backup features, and generate an alert upon the model classifying the additional changes as comprising damaged information, typically due to an information loss event.

In embodiments described herein, the term data may also be used to refer to information. Therefore, the terms "data" and "information" may be used interchangeably (e.g., "data loss event" and "information loss event").

While many data loss events can be detected shortly after they occur, some data loss events may not be detected for several days or even a few weeks. By analyzing characteristics of backups that are typically performed on a periodic basis, systems implementing embodiments of the present invention can be used to detect a data loss event upon completing the first backup operation subsequent to the data loss event.

System Description

FIG. 1 is a block diagram that shows a security server 20 that can communicate with a backup storage system 22 via a public network such as Internet 24, in accordance with an embodiment of the present invention. In the configuration shown in FIG. 1, backup storage system 22 can also communicate with a primary storage system 26 via Internet 24.

Primary storage system 26 comprises a storage processor 28 and a storage memory 30 that can store information 31. In embodiments described hereinbelow, a backup operation 45 can back up (i.e., copy) information 31 to backup storage system 22, and security server 20 can analyze characteristics (i.e., features as described hereinbelow) of the backup so as to detect whether or not information 31 has been damaged or destroyed.

In one embodiment, information 31 comprises one or more primary information sources 32, each of the primary information sources comprising a primary information source identifier (ID) 34 and a set of primary information source components 36. In some embodiments, processor 28 can manage primary information sources 32 by adding, deleting and modifying primary information source components 36 in response to storage requests received from one or more host computers (not shown).

In another embodiment, information 31 may comprise a cloud-based file storage service 37 such as GOOGLE DRIVE™, provided by ALPHABET INC., 1600 Amphitheatre Parkway, Mountain View, CA, USA. In this embodiment, information 31 (i.e., the cloud-based file storage service) may comprise primary information sources 32.

In an additional embodiment, information 31 may comprise one or more object storage service (OSS) instances 33 that a cloud provider (e.g., AMAZON WEB SERVICES™, provided by AMAZON. COM, INC., 410 Terry Avenue North, Seattle, WA, USA) can deploy so as to provide Infrastructure as a service (IaaS). An example of a given OSS instance 33 is Simple Storage Service™ (S3™), provided by AMAZON.COM.

In a further embodiment, information 31 may comprise a file system such as NEW TECHNOLOGY FILE SYSTEM™ (NTFS™), provided by MICROSOFT CORPORATION, One Microsoft Way, Redmond, WA, USA. In this embodiment, information 31 (i.e., the file system) may comprise primary information sources 32.

While embodiments herein describe analyzing characteristics of backups 45 of primary information sources 32 so as to detect whether or not information 31 has been damaged or destroyed, using these embodiments to detect any events that damages or destroyed information 31 (e.g., in either object storage service 33 or file system 35) is considered to be within the spirit and scope of the present invention.

Backup storage system 22 comprises a backup processor 38 and a backup memory 40. that stores a set of backup datasets 42 and a set of restore datasets 44 that enable primary storage system 26 to perform backup operations 45 and restore operations 46. In embodiments herein, primary storage system 26 can perform a given backup operation 45 by copying primary information source components 36 to a given backup dataset 42. Restore operations 46 are described in the description referencing FIG. 2 hereinbelow.

In some embodiments, backup datasets 42 (also referred to herein simply as backups) have a one-to-one correspondence with backup operations 45. In some embodiments, each backup dataset 42 comprises a copy of primary information source 32 at a specific point in time. Therefore, each given backup dataset 42 references a state 47 of information 31 in primary information 32 source at the time of the corresponding backup operation. Backup datasets 42 and restore datasets 44 are respectively described in the descriptions referencing FIGS. 2 and 3 hereinbelow.

Security server 20 comprises a security processor 48, and a security memory 50 that stores a model 52, a plurality of backup feature sets 54 that have a one-to-one correspondence with backup datasets 42, and a plurality of restore feature sets 56 that have a one-to-one correspondence with restore datasets 44. As described herein, for each given backup dataset 42, processor 48 extracts the corresponding backup feature set for the given backup dataset and stores the corresponding backup feature set to memory 50. Likewise, for each given restore dataset 44, processor 48 extracts the corresponding restore feature set for the given restore dataset and stores the corresponding restore feature set to memory 50. Backup feature sets 54 and restore feature sets 56 are respectively described in the descriptions referencing FIGS. 5 and 4 hereinbelow.

Processors 28, 38 and 48 comprise a general-purpose central processing unit (CPU) or a special-purpose embedded processor, which is programmed in software or firmware to carry out the functions described herein. This software may be downloaded to security server 20, backup storage system 22 and primary storage system 26 in electronic form, over a network, for example. Additionally or alternatively, the software may be stored on tangible, non-transitory computer-readable media, such as optical, magnetic, or electronic memory media. Further additionally or alternatively, at least some of the functions of processors 28, 38 and 48 may be carried out by hard-wired or programmable digital logic circuits.

Examples of memories 30, 40 and 50 include dynamic random-access memories, non-volatile random-access memories, and non-volatile storage devices such as hard disk drives and solid-state disk drives.

In some embodiments, tasks described herein performed by processors 28, 38 and 48 may be split among multiple physical and/or virtual computing devices. In other embodiments, these tasks may be performed in a managed cloud service and use cloud-based storage to information elements stored in memories 30, 40 and 50 as described herein.

Figure 2:
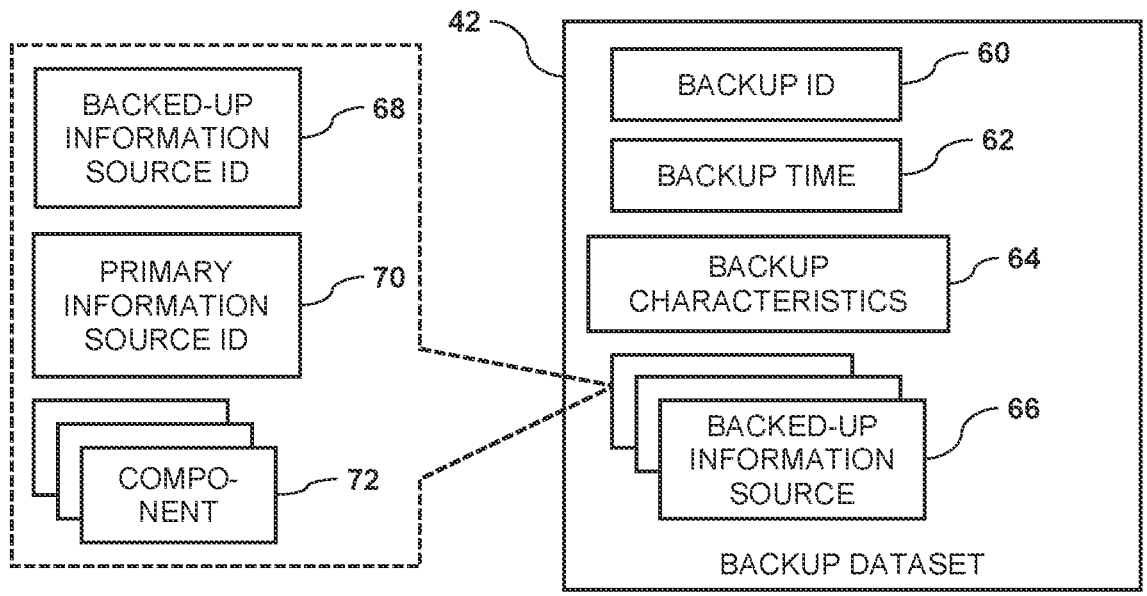
FIG. 2 is a block diagram that shows an example of information elements in a given backup operation, in accordance with an embodiment of the present invention.

FIG. 2 is a block diagram showing example of information elements in a given backup dataset 42, in accordance with an embodiment of the present invention. In the configuration shown in FIG. 2, the given backup dataset comprises:

A unique backup ID 60.

A backup time 62 indicating a date and time for the corresponding backup operation.

Backup characteristics 64 comprising metadata and configuration information for the corresponding backup operation. In embodiments described hereinbelow, processor 48 can extract, from backup characteristics 64, backup feature set 54 for the corresponding backup operation.

A set of backed-up information sources 66 typically having a one-to-one correspondence with primary information sources 32. Each given backup information source 66 may comprise:

A unique backed-up information source ID 68 for the given backup information source.

A primary information source ID 70 referencing a given primary information source 32. In some embodiments, the given backup information source comprises a backup for the given primary information source.

A set of backed-up information source components 72 comprising respective copies of primary information source 36 in the given primary information source at backup time 62.

In embodiments herein, primary storage system 26 can perform a given restore operation 46 by copying backed-up information source components 72 from a given backup dataset 42 to one or more primary information sources 32.

While FIG. 2 shows an example of a configuration of a given backup dataset 42, other configurations of backup datasets 42 are considered to be within the spirit and scope of the present invention. For example, backup datasets 42 may comprise snapshots (e.g., copy-on-write snapshots and/or volume snapshot service snapshots).

Figure 3:
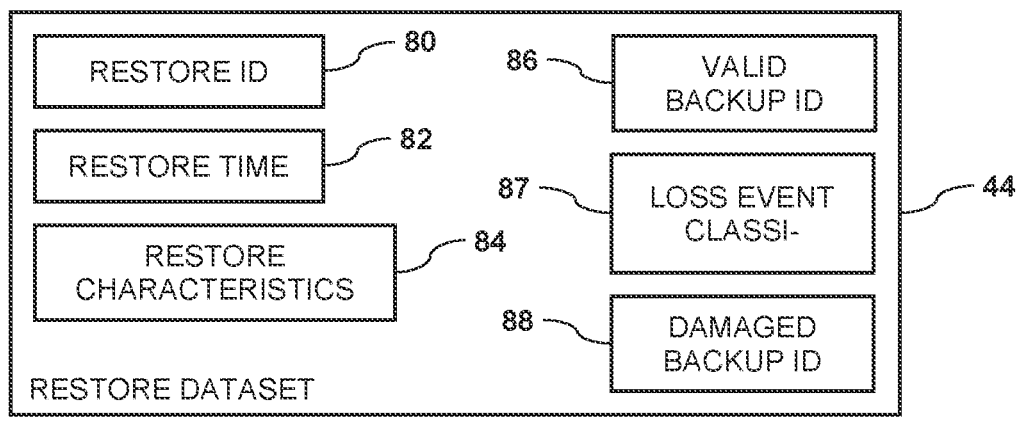
FIG. 3 is a block diagram that shows an example of information elements in a restore operation, in accordance with an embodiment of the present invention.

FIG. 3 is a block diagram showing example of information elements in a given restore dataset 44, in accordance with an embodiment of the present invention. In embodiments described herein, restore datasets 44 have a one-to-one correspondence with restore operations 46 that restore information 31 from a given backup dataset 42 to one or more primary information sources 32.

In the configuration shown in FIG. 3, the given restore dataset comprises:

A unique restore ID 80.

A restore time 82 indicating a date and a time of the corresponding restore operation.

Restore characteristics 84 comprising metadata and configuration information for the corresponding restore operation. In embodiments described hereinbelow, processor 48 can extract, from restore characteristics 84, the restore feature set corresponding to the given restore dataset.

A valid backup ID 86 comprising a first given backup ID 60 in a first given backup dataset 42 from which processor 38 restored one or more backed-up information source components 72 (i.e., in the first given dataset) in the restore operation corresponding to the given restore dataset.

A data loss event classification 87 indicating a class of a data loss event (e.g., destruction, corruption, malicious encryption, accidental deletion) that triggered the corresponding restore operation.

A damaged backup ID 88 comprising a second given backup ID for a second given backup dataset 42 that comprises damaged information 31 in one or more of its backed-up information source components 72. In embodiments described herein, the damaged or destroyed information triggered the restore operation corresponding to the given restore dataset.

Figure 4:
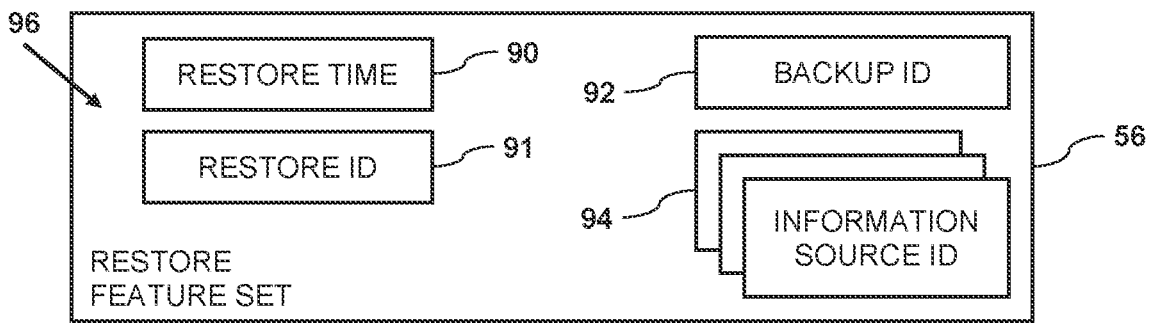
FIG. 4 is a block diagram that shows an example of restore features that the security server can use to train and implement the model, in accordance with an embodiment of the present invention.

FIG. 4 is a block diagram showing example of information elements in a given restore feature set 56 for its corresponding restore dataset 44 (and therefore its corresponding restore operation 46), in accordance with an embodiment of the present invention. In the configuration shown in FIG. 4, the given restore feature set comprises:

A restore time 90 comprising restore time 82 in the corresponding restore dataset.

A restore ID 91 comprising restore ID 80 in the corresponding restore dataset.

A backup ID 92 comprising backup ID 60 in a given backup dataset 42 from which information 31 was restored in the corresponding restore operation.

One or more information source IDs 94 comprising respective backed-up information source IDs 68 referencing backed-up information source 66 in the given backup from which information 31 was restored in the corresponding restore operation.

In embodiments herein, restore time 90, backup ID 92 and information source IDs 94 may be referred to collectively as restore features 96.

Figure 5:
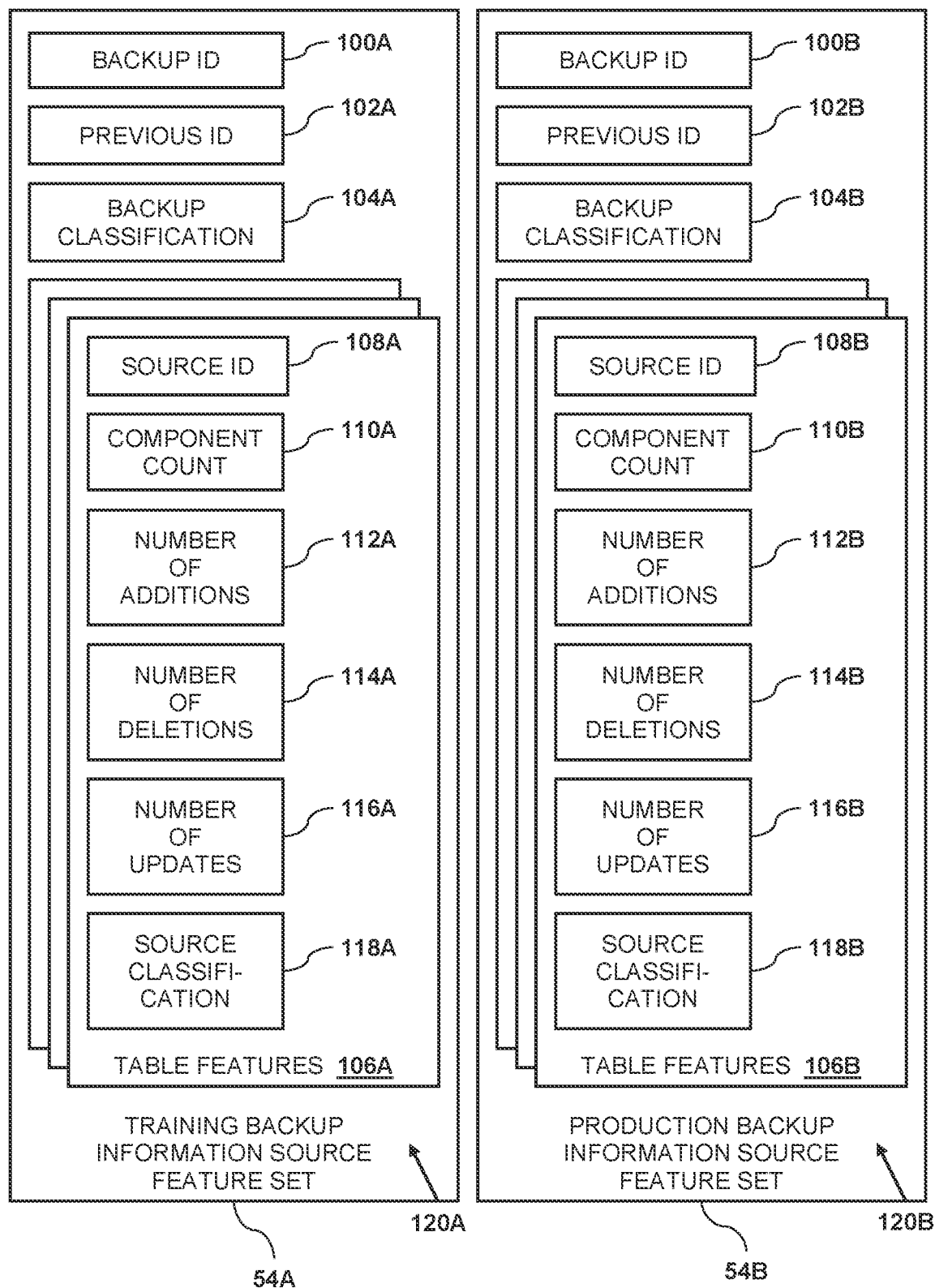
FIG. 5 is a block diagram that shows an example of backup features that the security server can use to train and implement the model, in accordance with an embodiment of the present invention.

FIG. 5 is a block diagram showing example of information elements in a given backup feature set 56 for its corresponding backup dataset 42, in accordance with an embodiment of the present invention. In the configuration shown in FIG. 5, the given backup feature set comprises:

A backup ID 100 storing a first given backup ID 60 referencing a first given backup dataset 42.

A previous ID 102 storing a second given backup ID 60 referencing a second given backup dataset 42. In embodiments herein, the second given backup dataset comprises the most recent backup dataset preceding the first given backup dataset.

A backup classification 104. In embodiments herein, classification 104 indicates whether the first given backup dataset stores valid or damaged information 31. Computing backup classification 104 is described in the description referencing FIG. 7 hereinbelow. In some embodiments, storing VALID to backup classification 104 classifies the given backup dataset as storing only valid information 31 (i.e., no damaged information 31), and storing DAMAGED to backup classification 104 classifies the given backup dataset as storing damaged information 31.

A set of information source features 106. In some embodiments, each backup feature set 54 may comprise a given set of information source features 106 for each given primary information source 32. In these embodiments the given set of information source features 106 for the given information source may store information such as:

An information source ID 108 storing primary information source ID 34 for the given primary information source.

A component count 110 indicating a number of primary information source components 36 for the given primary information source in the first given backup dataset.

A number of additions 112 indicating a number of new primary information source components 36, i.e., the primary table information source components that were added to the given primary information source in the first given backup dataset during a time period starting with the backup time in the second given backup dataset and ending with the backup time in the first given backup dataset.

A number of deletions 114 indicating a number of primary information source components 36 that were deleted from the given primary information source during a time period starting with the backup time in the second given backup dataset and ending with the backup time in the first given backup dataset.

A number of updates 116 indicating a number of primary information source components s 36 that were updated in the given primary information source during a time period starting with the backup time in the second given backup dataset and ending with the backup time in the first given backup dataset.

An information source classification 118 indicating whether the given primary information source at backup time 62 in the first given backup dataset stores valid or damaged information 31. Computing information source classification 118 is described in the description referencing FIG. 7 hereinbelow. Similar to backup classification 104, storing VALID to backup classification 104 classifies the first given backup dataset as storing only information 31 (i.e., no damaged information 31), and storing DAMAGED to backup classification 104 classifies the first given backup dataset as storing damaged information 31.

In embodiments herein, backup ID 100, previous ID 102, backup classification 104 and information source features 106 may be referred to collectively as backup features 120. Additionally backup feature sets 54 and their respective data components can be differentiated by appending a letter to the identifying numeral, so that the backup feature sets comprise training backup feature sets 54A and a production backup feature set 54B. Each training backup feature set 54A comprises backup ID 100A, previous ID 102A, backup classification 104A (also referred to herein as label 104A) and information source features 106A comprising information source ID 108A, component count 110A, number of additions 112A, number of deletions 114A, number of updates 116A, information source classification 118A and backup features 120A. Likewise, production backup feature set 54B comprises backup ID 100B, previous ID 102B, backup classification 104B and information source features 106B comprising information source ID 108B, component count 110B, number of additions 112B, number of deletions 114B, number of updates 116A, information source classification 118B and backup features 120B.

Model Training and Backup Classification

Figure 6:
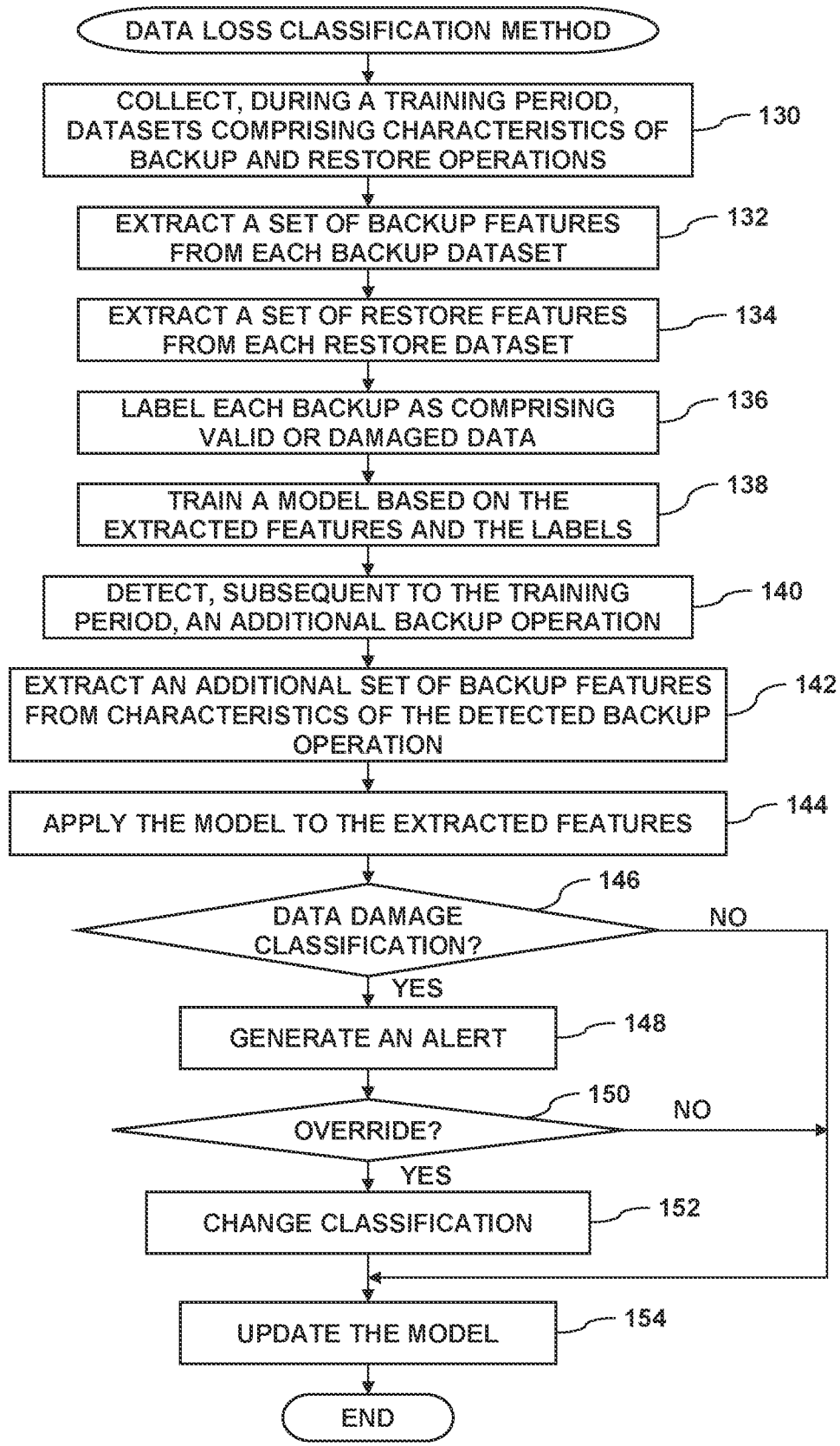
FIG. 6 is a flow diagram that schematically illustrates a method of training and using the model to analyze characteristics of backups so as to automatically classify data loss events, in accordance with an embodiment of the present invention.

FIG. 6 is a flow diagram that schematically illustrates a method of training and using model 52 for detecting any damaged information 31 in one or more primary information source 32, in accordance with an embodiment of the present invention.

In step 130, processor 48 collects, during a training period (also referred to herein as a time period), characteristics of backup operations 45 and restore operations 46, and populates, with the collected characteristics, backup datasets 42 and restore datasets 44 using embodiments described supra. As described supra, processor 28 performs the backup operations by copying primary information source 32 from primary storage system 26 to respective backup datasets on backup storage system 22, and the storage processor can also perform the restore operations in which one or more of the primary information source in the primary storage system are restored to given state 47 of a given backup operation 45.

Additionally, each given restore operation 46 typically has an associated backup operation 45 comprising the backup operation from which processor 28 copied backed-up information source components 72 to one or more primary information source 32.

In step 132, for each given backup dataset 42 (corresponding to a given backup operation 45), processor 48 adds a new training backup feature set 54A, extracts backup features 120A from the given backup dataset, and populates the new training backup feature set with the extracted backup features. As described supra, features 120A reference changes to information 31 stored in the primary information source and a time of the backup operation referenced by the given backup dataset.

In step 134, for each given restore dataset 44 (corresponding to a given restore operation 46), processor 48 adds a new restore feature set 56, extracts restore features 96 from the given restore dataset, and populates the new restore feature set with the extracted restore features. As described supra, restore features 96 comprising the backup operation associated with the restore operation referenced by the given restore dataset and a time of the restore operation referenced by the given restore dataset.

In step 136, processor 48 labels each backup operation 45 as comprising valid or damaged information 31 stored in backed-up information source components 72. In embodiments herein processor 48 label the backup operations by populating backup can classifications 104A in the training backup feature sets. Labeling the backup operations by populating backup classifications 104A described in the description referencing FIG. 7 hereinbelow. Labeling information source classifications 118A is typically not performed when training the model.

In step 138, processor 48 trains, using features sets 54 and 56, model 52 to analyze a given backup dataset 42 so as to classify the backup referenced by the given backup dataset as comprising valid or damaged information 31. For example, processor 48 can execute a software application STATISTICAL PACKAGE FOR THE SOCIAL SCIENCES™ (also known as SPSS™, that is produced by INTERNATIONAL BUSINESS MACHINES CORPORATION of One New Orchard Road, Armonk, NY, USA) that can train model 52 as a two-layer neural network. In embodiments herein training model 52 may also be referred to as information processor 48 to apply model 52 so as to classify changes to data 31 stored in the backed-up information components 72 in a given backup dataset.

In step 140, processor 48 detects, during production (i.e., subsequent to training model 52 with feature sets 54 and 56 that the security processor extracted during the training period), an additional backup operation 45. Upon detecting the additional backup, processor 48 can add a new backup dataset 42, and populate the new backup dataset with characteristics of the additional backup operation using embodiments described hereinabove.

In step 142 processor 48 uses embodiments described hereinabove to extract backup features 120B from the new backup dataset, and to store the extracted backup features 120B to production backup feature dataset 54B.

In step 144, processor 48 applies model 52 to backup features 120B so as to classify whether or additional backup operation comprises damaged information 31. In some embodiments, upon classifying the additional backup operation, processor 48 can store the classification to backup classification 104B in production backup feature set 54B. If model 52 classified each backed-up information source 66 in the additional backup operation, processor 48 can store these classifications to information source classifications 118B in production backup feature set 54B.

In step 146, if model 52 classifies the additional backup operation as comprising damaged information 31, then in step 148, processor 48 can generate an alert. The alert may comprise backup features 120B that can assist a system administrator (not shown) in identifying (e.g., using information source classifications 118B) whose primary information source 32 comprise damaged information 31.

In some embodiments, classifying a given backup operation 45 (i.e., during training model 52 or during production) as comprising damaged information 31 may comprise ascribing a given primary information source 32 (i.e., that was backed up during the given backup operation) to a data loss event classification 87 such as destruction of information 31, corruption of information 31, malicious encryption of information 31 or accidental deletion of information 31.

In step 150, if processor 48 receives an override for the generated alert, then in step 152, the security changes backup classification 104B for the additional backup operation from DAMAGED to VALID. In some embodiments, upon reviewing the alert and the backup dataset generated by the additional backup operation, a systems analyst may determine that the backup dataset does not comprise any damaged information 31, and convey the override to processor 48 in response to the determination.

Finally, step 154, processor 48 updates model 52 with the production backup feature set (i.e., that the security processor extracted and generated for the additional backup operation), and the method ends.

Returning to step 150, if processor 48 does not receive an override for the generated alert, then the method continues with step 154.

Returning to step 146, if model 52 classifies the additional backup operation as not comprising damaged information 31, then the method continues with step 154.

Figure 7:
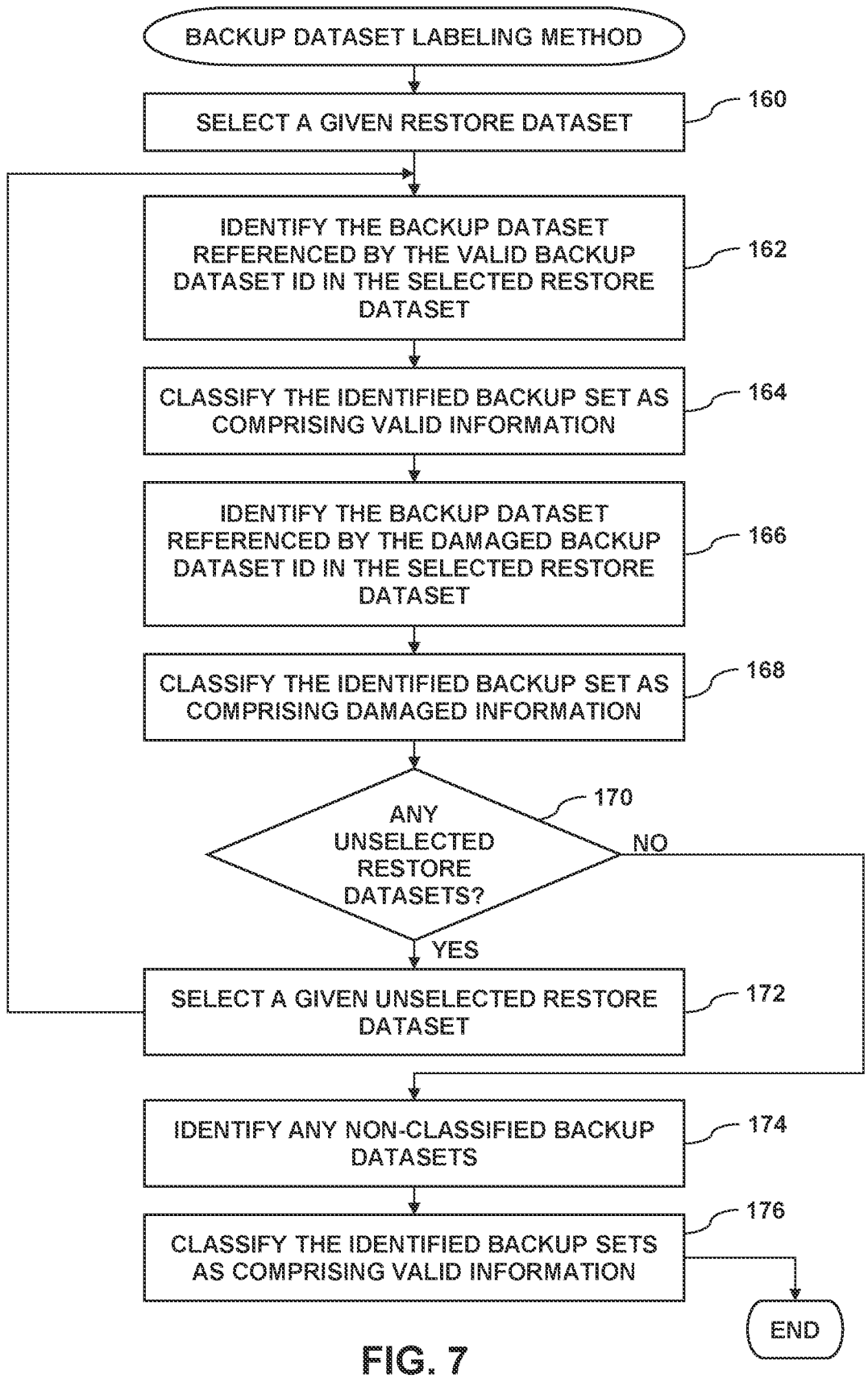
FIG. 7 is a flow diagram that schematically illustrates a method of labeling characteristics of backups for training the model, in accordance with an embodiment of the present invention.

FIG. 7 is a flow diagram that schematically illustrates a method of labeling backup datasets 42 referencing backup operations 45 for training model 52, in accordance with an embodiment of the present invention.

In step 160, processor 48 selects a given restore dataset 44.

In step 162, processor 48 retrieves valid backup ID 86 from the selected restore dataset. As described supra, the retrieved valid backup ID comprises a given backup ID 60 in a given backup dataset 42 from which processor 38 restored one or more backed-up information source components 72 in the restore operation corresponding to the given restore dataset.

In step 164, processor 48 classifies the given backup dataset as comprising valid information 31. To classify the given backup dataset as comprising valid information 31, processor 48 can identify the training backup dataset whose backup ID 100A matches the retrieved backup ID 86, and store VALID to backup classification 104A in the identified training backup dataset.

In step 166, processor 48 retrieves damaged backup ID 88 from the selected restore dataset. As described supra, the retrieved damaged backup ID comprising a given backup ID for a given backup dataset 42 triggered the restore operation corresponding to the given restore dataset.

In step 168, processor 48 classifies the given backup dataset as comprising damaged or destroyed information 31. To classify the given backup dataset as comprising damaged or destroyed information 31, processor 48 can identify the training backup dataset whose backup ID 100A matches the retrieved backup ID 86, and store DAMAGED to backup classification 104A in the identified training backup dataset.

In step 170, processor 48 checks if there are any unselected restore datasets 44. If there are any unselected restore datasets 44, then in step 172, processor 48 selects a given unselected restore dataset 44, and the method continues with step 162.

Returning to step 170, are no remaining unselected restore datasets 44, then in step 174, processor 48 identifies any backup datasets 42 that were not classified using embodiments described in the description referencing steps 160-172 hereinabove (i.e., by storing VALID or DAMAGED to backup classification 104A in the corresponding training backup dataset 54A).

Finally, in step 176, processor 48 classifies the identified (i.e., in step 174) backup datasets as comprising valid information 31, and the method ends. In some embodiments, processor 48 can classify the identified backup datasets as comprising valid information 31, storing VALID to backup classification 104A in the training backup feature sets corresponding to the identified backup datasets.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method, comprising:
   collecting, during a time period, characteristics of:
   (a) multiple backup operations performed on information sources from a primary storage system to create respective backups comprising copies of the information sources that are stored on a backup storage system and
   (b) multiple restore operations in which the copies of one or more of the information sources are retrieved from the backup storage system to the primary storage system so that the information sources in the primary storage system are restored to a state of one of the backups, each of the restore operations having an associated backup operation;

extracting, from the collected characteristics for each given backup operation, a set of backup features comprising changes to the information stored in the information sources and a time of the given backup operation;

extracting, from the collected characteristics for each given restore operation, a set of restore features comprising the associated backup operation for the given restore and a time of the given restore operation;

training, based on the sets of the backup features and the sets of the restore features, a processor to apply a model for classifying a given change to the information as comprising only valid information or comprising damaged information due to a data loss event in one of the information sources;

detecting, subsequent to the time period, an additional backup operation;

extracting an additional set of backup features comprising additional changes to the information in the additional backup operation;

applying, by the processor, the model to the additional set of backup features; and generating an alert upon the model classifying the additional changes as comprising damaged information.

2. The method according to claim 1, wherein the information sources comprise respective sets of information source components, and further comprising identifying a most recent backup operation prior to the given backup operation, and wherein extracting the backup features comprises detecting the changes between the most recent backup operation prior to the given backup and the given backup operation.

3. The method according to claim 2, wherein the information sources comprise tables, and wherein the information source components comprise records.

4. The method according to claim 2, wherein a given backup feature comprises a number of new information source components in a given information source.

5. The method according to claim 2, wherein a given backup feature comprises a number of the information source components deleted from a given information source.

6. The method according to claim 2, wherein a given backup feature comprises a number of the updated information source components in a given information source.

7. The method according to claim 2, wherein a given backup feature comprises a count of the information source components in a given information source.

8. The method according to claim 1, wherein the information sources comprise primary information sources, wherein the backups comprise respective backup information sources having a one-to-one correspondence with the primary information sources, and wherein a given restore feature for the given restore operation comprises a given backup information source used in the given restore operation.

9. The method according to claim 1, wherein the model classifying the changes as comprising damaged information comprises ascribing the given information source to a data loss event class.

10. The method according to claim 9, wherein the data loss event class comprises information destruction.

11. The method according to claim 9, wherein the data loss event class comprises information corruption.

12. The method according to claim 9, wherein the data loss event class comprises malicious encryption.

13. The method according to claim 9, wherein the data loss event class comprises accidental deletion.

14. The method according to claim 1, and further comprising computing respective labels for the backups, wherein a given feature comprises the computed labels, and wherein a given label for a given backup indicates if changes in the given backup comprises damaged or only valid information.

15. The method according to claim 14, wherein the restore operations comprise respective first identifiers (IDs) referencing respective first backup operations comprising only valid information, and wherein computing the labels comprises classifying the referenced first backup operations as storing only valid information.

16. The method according to claim 15, wherein the restore operations comprise respective second IDs referencing respective second backup operations comprising damaged information in a given information source, and wherein computing the labels comprises classifying the referenced second backup operations as storing damaged information.

17. The method according to claim 1, wherein a given information source comprises a file system.

18. The method according to claim 1, wherein a given information source comprises a cloud-based storage instance.

19. The method according to claim 1, wherein a given information source comprises an object storage service.

20. The method according to claim 1, wherein a given restore feature for the given restore operation comprises a time of the restore operation.

21. The method according to claim 1, wherein the model classifying the changes as comprises damaged information comprises classifying the additional backup as comprising damaged information.

22. The method according to claim 1, and further comprising training the model with the additional set of backup features.

23. The method according to claim 22, and further comprising receiving an override for the alert, changing the classification for the additional backup from comprising damaged information to comprising only valid information, and training the model with the updated classification.

24. An apparatus, comprising:
a memory configured to store a model; and
one or more processors configured:
during a time period, to collect and to store, to the memory, characteristics of:
(a) multiple backup operations performed on information sources from a primary storage system to create respective backups comprising copies of the information sources that are stored on a backup storage system and
(b) multiple restore operations in which the copies of one or more of the information sources are retrieved from the backup storage system to the primary storage system so that the information sources in the primary storage system are restored to a state of one of the backups, each of the restore operations having an associated backup operation,
to extract, from the collected characteristics for each given backup operation, a set of backup features comprising changes to the information stored in the information sources and a time of the given backup operation,
to extract, from the collected characteristics for each given restore operation, a set of restore features comprising the associated backup operation for the given restore and a time of the given restore operation, to train, based on the sets of the backup features and the sets of the restore features, a given processor to apply the model for classifying a given change to the information as comprising only valid information or comprising damaged information due to a data loss event in one of the information sources, to detect, subsequent to the time period, an additional backup operation, to extract an additional set of backup features comprising additional changes to the information in the additional backup operation, to apply the model to the additional set of backup features, and to generate an alert upon the model classifying the additional changes as comprising damaged information.

25. A computer software product, the product comprising a non-transitory computer-readable medium, in which program instructions are stored, which instructions, when read by a computer, cause the computer:

to collect, during a time period, characteristics of:
(a) multiple backup operations performed on information sources from a primary storage system to create respective backups comprising copies of the information sources that are stored on a backup storage system and
(b) multiple restore operations in which the copies of one or more of the information sources are retrieved from the backup storage system to the primary storage system so that the information sources in the primary storage system are restored to a state of one of the backups, each of the restore operations having an associated backup operation;

to extract, from the collected characteristics for each given backup operation, a set of backup features comprising changes to the information stored in the information sources and a time of the given backup operation;

to extract, from the collected characteristics for each given restore operation, a set of restore features comprising the associated backup operation for the given restore and a time of the given restore operation;

to train, based on the sets of the backup features and the sets of the restore features, a processor to apply a model for classifying a given change to the information as comprising only valid information or comprising damaged information due to a data loss event in one of the information sources;

to detect, subsequent to the time period, an additional backup operation;

to extract an additional set of backup features comprising additional changes to the information in the additional backup operation;

to apply, by the processor, the model to the additional set of backup features; and to generate an alert upon the model classifying the additional changes as comprising damaged information.

* * * * *